Figure 1:
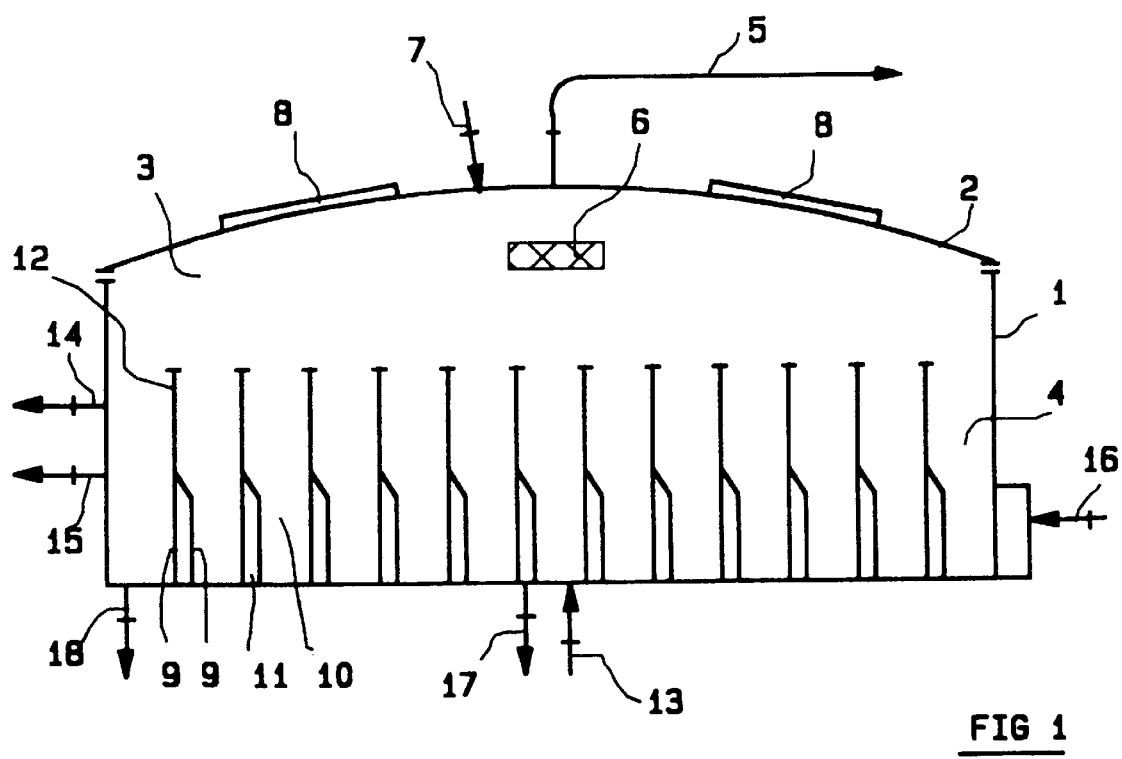

United States Patent
Bindelle

[11] Patent Number: 5,929,206
[45] Date of Patent: Jul. 27, 1999

[54] CONTINUOUS PROCESS FOR REMOVING THE RESIDUAL MONOMER OR MONOMERS FROM AN AQUEOUS LATEX OF A SYNTHETIC POLYMER AND DEVICE FOR CARRYING IT OUT

[75] Inventor: Jean-Paul Bindelle, Mont-Saint-Guibert, Belgium

[73] Assignee: Solvay (Société Anonyme), Brussels, Belgium

[21] Appl. No.: 08/003,401

[22] Filed: Jan. 12, 1993

[30] Foreign Application Priority Data

Jan. 13, 1992 [BE] Belgium ................................. 9200027

[51] Int. Cl.⁶ .............................. C08L 27/06; B01D 1/00
[52] U.S. Cl. ......................... 528/503; 523/318; 523/324; 523/328; 528/501; 524/567; 159/DIG. 4; 159/DIG. 10
[58] Field of Search .................... 523/318, 324, 523/328; 524/567; 528/503, 501; 159/DIG. 10, DIG. 4

[56] References Cited

U.S. PATENT DOCUMENTS

| 2,330,672 | 9/1943 | Braak ....................................... 523/324 |
| 3,865,672 | 2/1975 | Metzinger et al. . |
| 3,974,023 | 8/1976 | Bowers ........................... 159/DIG. 10 |
| 4,017,355 | 4/1977 | Kiyota et al. ............................. 159/49 |
| 4,032,497 | 6/1977 | Kidoh et al. ............................. 523/324 |
| 4,130,527 | 12/1978 | Miller et al. ............................. 523/318 |
| 4,315,843 | 2/1982 | Vidotto et al. ......................... 523/318 |
| 4,808,262 | 2/1989 | Aneja et al. ............................. 523/324 |
| 5,084,134 | 1/1992 | Mattiusi et al. ................. 159/DIG. 10 |

FOREIGN PATENT DOCUMENTS

| 0352727A2 | 1/1990 | European Pat. Off. . |
| 1553828 | 10/1979 | United Kingdom . |

*Primary Examiner*—Andrew E.C. Merriam
*Attorney, Agent, or Firm*—Venable; John W. Schneller; Catherine M. Voorhees

[57] ABSTRACT

The latex is treated by passage through a heat exchanger consisting of a closed chamber 1 divided into two distinct superposed parts, the unobstructed upper part 3 being placed under reduced pressure and communicating with a plant for recovery of the residual monomer or monomers, and the lower part 4 being equipped with a partitioning 9 bounding two separate extended and adjoining circuits 10 and 11, one of the circuits 10 being traversed by the latex to be treated and being maintained in communication, via its top and over its entire path, with the upper part 3 of the chamber, and the other circuit 11, isolated from the upper part 3 of the chamber, being traversed by a heat-transfer fluid maintained at a temperature of 40 to 100° C.

Preferably, the two circuits 10 and 11 are bounded by a partitioning 9 arranged in the form of a double spiral.

6 Claims, 1 Drawing Sheet

CONTINUOUS PROCESS FOR REMOVING THE RESIDUAL MONOMER OR MONOMERS FROM AN AQUEOUS LATEX OF A SYNTHETIC POLYMER AND DEVICE FOR CARRYING IT OUT

The present invention relates to a process for removing the residual monomer or monomers present in an aqueous latex of synthetic polymer originating from a manufacturing plant, as well as to a device which is especially suitable for carrying out this process.

The production of a latex of synthetic polymer is normally accomplished by polymerisation of the monomer or monomers of which the polymer is composed using a conventional process of emulsion or microsuspension polymerisation.

The latex obtained according to such a process generally contains, even after conventional degassing at the end of the polymerisation reaction, an appreciable amount of residual monomer(s), which are either dissolved in the aqueous phase, or absorbed or occluded by the particles of polymer.

It is, however, often desirable to remove virtually all trace of monomer(s) in the latex produced, especially if the quality of the polymer is thereby improved, if the monomer or monomers are expensive, in this case justifying a recovery, or if the presence of monomer(s), even in minimal amounts, constitutes a danger such as a risk of toxicity or risk of explosion.

For this purpose, it has already been proposed, in particular in the documents DE-A-2,162,860, BE-A-847,198, DE-A-2,531,429 and U.S. Pat. No. 4,130,527, to remove the residual monomers contained in a latex by direct treatment of these monomers by injection of an inert gas saturated with moisture, said treatment being performed either in a vertical-tube evaporator, or in a revolving inclined cylinder or else in a falling thin-film column. It has, however, been observed that these techniques do not generally permit an effective removal of the monomer or monomers from the latex treated, and/or can impair the thermal or mechanical stability (coagulation) of the polymer treated. In addition, these techniques often give rise to problems caused by foaming of the latex.

A novel process has now been found for the treatment of latex, which enables a high productivity to be assured while preserving, or even improving, the thermal stability of the polymer treated, and virtually eliminating the problems of foaming.

The present invention consequently relates primarily to a continuous process for removing the residual monomer or monomers from an aqueous latex of a synthetic polymer originating from a manufacturing plant, which is characterised in that the said latex is treated by passage through a heat exchanger consisting of a closed chamber divided into two distinct superposed parts, the unobstructed upper part being placed under reduced pressure and communicating with a plant for recovery of the residual monomer or monomers, and the lower part being equipped with a partitioning bounding two separate extended and adjoining circuits, one of the circuits being traversed by the latex to be treated and being maintained in communication, via its top and over its entire path, with the upper part of the chamber, and the other circuit, isolated from the upper part of the chamber, being traversed by a heat-transfer fluid maintained at a temperature of 40 to 100° C., and preferably 60 to 100° C.

In the process according to the invention, the latex to be treated is subjected to a steady and constant flow along its circuit, and is gradually brought to and maintained at its boiling point under the vacuum conditions prevailing in the chamber so as to effect the removal of the monomer or monomers and, where appropriate, of other volatile components such as solvents. In addition, since the heat transfer is effected through the partition bounding the circuits, there is no direct and sudden contact with the heat-transfer fluid. In order to effect a gradual heating of the latex to be treated, it can, moreover, prove very advantageous to drive the latex to be treated and the heat-transfer fluid in opposite directions in their respective circuits.

In the process according to the invention, the latex to be treated can, in addition, advantageously be preheated to a temperature of 30 to 90° C. before its introduction into the chamber. This preheating can, in particular, be carried out by passing this latex through a conventional heat exchanger. As a heat-transfer fluid in this preheating stage, the treated latex emerging from the chamber may advantageously be used. In this way, the latex leaving the chamber is gradually cooled, and the calories thus released are utilised economically for preheating the latex entering the treatment chamber.

In the process according to the invention, the upper part of the chamber is preferably maintained under a reduced pressure of 0.01 to 0.99 bar, and preferably 0.1 to 0.9 bar. In general, there is an optimum reduced pressure that enables boiling to be effected at a sufficient temperature to permit the complete removal of the monomers without decreasing the mechanical stability of the latex and impairing the characteristics of the finished product.

The heat-transfer fluid introduced into the chamber can be of any kind but, on economic grounds, it is generally preferable to use water.

In the process according to the invention, the useful cross-section and the length of the circuit traversed by the latex to be treated are chosen in such a way as to provide for a predetermined residence time of the latex in the chamber of 1 to 30 minutes with a flow rate of 1 to 10 $m^3/h$.

The process consequently makes possible a relatively short time of treatment of the latex, with the advantage that this treatment does not degrade the quality of the latex as a result of an excessive uptake of calories.

Moreover, in the process according to the invention, the ratio of the evaporation surface area to the volume of the latex treated is very high, and consequently the risk of foaming of the latex treated is reduced.

The process according to the invention is especially suitable for treating latices of vinyl chloride-based polymers produced by emulsion or microsuspension polymerisation, but it can obviously be utilised for treating other latices such as, in particular, rubber latices or those of polymers derived from other monomers.

In the process according to the invention, the monomer or monomers removed, together with the other constituents such as solvents, are preferably trapped and collected in recovery or neutralisation plants rather than discharged into the atmosphere.

In a secondary aspect, the present invention also relates to a device designed especially for carrying out the process described above.

The present invention hence also relates to a special device which is characterised in that it consists of a closed chamber divided into two distinct superposed parts, the unobstructed upper part being connected to a vacuum source in communication with a plant for recovery of the monomer or monomers, and the lower part being equipped with a partitioning bounding two separate extended and adjoining circuits, one of the circuits, intended for being traversed by the latex to be treated, being maintained in communication via its top face with the upper part of the chamber over the whole of its path, and the other circuit, intended for being traversed by a heat-transfer fluid, being isolated from the upper part of the chamber.

The chamber, which must be leakproof and which is preferably thermally insulated, can be of any shape, a cylindrical general shape usually being preferred on grounds of spatial requirement. In a preferred embodiment, the chamber consists of a metal casing of cylindrical general shape surmounted by a domed part which bounds two distinct superposed parts, the upper part via the dome being connected to the vacuum source in communication with the recovery plant.

The partitioning arranged in the lower part of the chamber for bounding the two circuits can be of any kind, insofar as it enables two separate extended and adjoining circuits that comply with the characteristics specified above to be produced. Preferably, the circuits thus bounded should be devoid of sharp angles capable of creating disturbances of motion or zones of stagnation, in particular in the latex being conveyed. In an embodiment which is preferred by the Applicant, the two circuits are bounded by a partitioning arranged in the form of a double spiral. The partitioning is generally made of metal, and its surface in contact with the latex to be treated is preferably polished. To avoid any deposition on the surface of the partitioning in contact with the latex to be treated, it can, in addition, prove advantageous to coat this surface with a film of a polymer that promotes sliding, such as a fluorinated polymer like, for example, a vinylidene fluoride-based polymer.

Both circuits are equipped with means, such as pipes equipped with valves, for introducing and withdrawing the fluids, latex to be treated and heat-transfer fluid, which they have to convey, these means preferably being arranged in such a way that these fluids traverse their respective circuits in opposite directions.

In general, the Applicant prefers the two circuits to be arranged and constructed in such a way that the heat-exchange surface area is equal to at least 10 m². Exchange surface areas of 10 to 60 m² are customarily used, but larger exchange surface areas are not ruled out for plants that have to provide for high flow rates.

Since the latices treated can contain, on entry, particles that have a tendency to settle, it can prove useful to provide, in the lower part of the circuit traversed by the latex, means for enabling a periodic bleeding of this circuit to be carried out for the purpose of removing this settled material.

Similarly, although the process and the device normally enable latices to be treated without an undesired formation of foams, it can nevertheless be useful to provide, in the dome of the chamber, means for introducing an antifoaming agent into the latex treated, and/or means of mechanical defoaming, for example of the impeller type.

The device according to the invention is, moreover, explained in greater detail in the description which follows of a preferential embodiment, and in which reference will be made to attached FIG. 1 which illustrates this device diagrammatically in elevation and in section.

As seen in FIG. 1, a device according to the invention consists of a metal chamber 1 of cylindrical general shape surmounted by a dome 2.

The chamber possesses an upper part 3, which is unobstructed and which is connected via the top of the dome 2 to a duct 5 connected to a vacuum source (not shown) in communication with a plant for recovery of the monomer or monomers (also not shown).

The upper part can also be equipped with a means of mechanical defoaming 6.

Lastly, the dome can be equipped with a means 7 for injecting an antifoaming agent and with windows 8 permitting visual inspection of the chamber.

The lower part 4 of the chamber 1 is equipped with a metal partitioning 9 arranged in a double spiral, which bounds two separate extended and adjoining circuits 10 and 11. One of the circuits 10, intended for being traversed by the latex to be treated, communicates via its top 10' and over its entire length with the upper part 3 of the chamber 1. Top 10' has an open face that extends along the entire path of circuit 10. The other circuit 11, intended for being traversed by the heat-transfer fluid, is isolated from the upper part 3 of the chamber 1.

The circuit 11 possesses a height of the order of 50 to 1000 mm and a width of 10 to 30 mm, while the circuit 10, advantageously prolonged with a baffle 12, has a height of the order of 50 to 1500 mm and a width of 10 to 40 mm, the values given above being in no way restrictive.

It is, however, preferable for the height of the latex in the circuit 10 to be greater than that of the circuit 11 in view of the fact that, during operation, it is desirable for the level of the latex treated to be such that the circuit 11 is always completely immersed in the latex. When the opposite is the case, there is, in effect, a risk of drying of the latex on the hot walls of the circuit 11 conveying the heat-transfer fluid, which can give rise to the formation of skins that are difficult to remove.

The latex to be treated is introduced into the circuit 10 through the centre of the chamber 1 via the pipe 13, and is extracted by overflowing on the periphery of the chamber 1 via the pipes 14 or 15 arranged in tiers, which are used, respectively, in accordance with the flow rate assigned to the device.

On the other hand, the heat-transfer fluid is introduced into the circuit 11 through its periphery via the pipe 16, and is extracted from the device through the centre of the chamber 1 via the pipe 17.

In this way, the latex to be treated and the heat-transfer fluid flow in opposite directions in their respective circuits, thereby permitting a more even heating of the latex to be treated. It is, however, quite obvious that the directions of flow of the latex to be treated and of the heat-transfer fluid could be reversed without fundamentally changing the process.

Lastly, a bleed pipe 18 may be provided in the bottom of the circuit 10, preferably at the end of the path of the latex to be treated, this bleed pipe making it possible, where appropriate, to carry out a periodic removal of microcoagulates accidentally formed or present in the latex treated.

The Applicant gives, moreover, below and as a guide, precise data regarding a device provided for the treatment of a latex of a vinyl chloride-based polymer, and also regarding its mode of operation.

Height of the chamber 1: 1600 mm
Diameter of the chamber: 2000 mm
Length of the circuits 10 and 11: 60 m
Width of the circuit 10: 30 mm
Height of the circuit 10: 600 mm
Width of the circuit 11: 10 mm
Height of the circuit 11: 250 mm
Entry temperature of the preheated latex: 70° C.
Temperature of the latex at emergence from the chamber: 80° C.
Flow rate of the latex: 2.5 t/h
Level of the latex in the circuit 10: 250 mm
pressure in the chamber 1: 0.47 bar
Speed of the latex in the circuit 10: 0.08 m/s Residence time of the latex in the chamber: 12.5 min Thermal power transferred: 94,000 kcal/h

I claim:

1. A continuous process for removing residual monomer from an aqueous latex of a synthetic polymer comprising:

treating said latex of a synthetic polymer containing residual monomer by passage through a heat exchanger comprising a closed chamber divided into two distinct superposed parts, an unobstructed upper part placed under reduced pressure and adapted to communicate with a plant for recovery of the residual monomer, and a lower part equipped with a partitioning bounding two separate extended and adjoining circuits, one of the circuits being traversed by the latex to be treated and being maintained in communication, via a top face extending over its entire path, with the upper part of the chamber, and the other circuit, isolated from the upper part of the chamber, being traversed by a heat-transfer fluid maintained at a temperature of about 40 to 100° C., said latex to be treated and said heat-transfer fluid traversing their respective circuits in opposite directions, and removing said residual monomer.

2. The process according to claim 1, wherein the latex is preheated to a temperature of about 30 to 90° C. before its introduction into the chamber, preferably by heat exchange with the treated latex extracted from the said chamber.

3. The process according to claim 1, wherein the upper part of the chamber is maintained under a reduced pressure of about 0.01 to 0.99 bar.

4. The process according to claim 1, wherein the heat-transfer fluid is water.

5. The process according to claim 1, wherein the useful cross-section and the length of the circuit traversed by the latex are chosen in such a way as to provide for a predetermined time of passage of the latex through the chamber of about 1 to 30 minutes with a flow rate of about 1 to 10 m$^3$ per hour.

6. A continuous process for removing residual monomer from an aqueous latex of a synthetic polymer selected from the group consisting of polyvinyl chloride, vinyl chloride-based copolymer, and rubber comprising:

treating said latex of a synthetic polymer selected from the group consisting of polyvinyl chloride, vinyl chloride-based copolymer, and rubber containing residual monomer by passage through a heat exchanger comprising a closed chamber divided into two distinct superposed parts, an unobstructed upper part placed under reduced pressure and adapted to communicate with a plant for recovery of the residual monomer, and a lower part equipped with a partitioning bounding two separate extended and adjoining circuits, one of the circuits being traversed by the latex to be treated and being maintained in communication, via a top face extending over its entire path, with the upper part of the chamber, and the other circuit, isolated from the upper part of the chamber, being traversed by a heat-transfer fluid maintained at a temperature of about 40 to 100° C., said latex to be treated and said heat-transfer fluid traversing their respective circuits in opposite directions, and removing said residual monomer.

* * * * *